(12) United States Patent
Mikowychok

(10) Patent No.: US 10,326,331 B2
(45) Date of Patent: Jun. 18, 2019

(54) BI-DIRECTIONAL VIBRATOR MECHANISM USABLE WITH A CONCRETE FINISHING TOOL

(71) Applicant: Frank Mikowychok, Lincoln, CA (US)

(72) Inventor: Frank Mikowychok, Lincoln, CA (US)

(*) Notice: Subject to any disclaimer, the term of this patent is extended or adjusted under 35 U.S.C. 154(b) by 0 days.

(21) Appl. No.: 15/946,126

(22) Filed: Apr. 5, 2018

(65) Prior Publication Data
US 2018/0278121 A1 Sep. 27, 2018

Related U.S. Application Data

(63) Continuation-in-part of application No. 15/634,980, filed on Jun. 27, 2017, now Pat. No. 10,184,217, (Continued)

(51) Int. Cl.
| | |
|---|---|
| *E01C 19/00* | (2006.01) |
| *H02K 7/06* | (2006.01) |
| *E04F 21/24* | (2006.01) |
| *E04G 21/06* | (2006.01) |
| *E01C 19/38* | (2006.01) |
| *E01C 19/40* | (2006.01) |
| *B28B 1/29* | (2006.01) |
| *H02K 5/24* | (2006.01) |
| *E01C 19/32* | (2006.01) |
| *E01C 19/35* | (2006.01) |

(Continued)

(52) U.S. Cl.
CPC .............. *H02K 7/061* (2013.01); *B28B 1/29* (2013.01); *E01C 19/32* (2013.01); *E01C 19/35* (2013.01); *E01C 19/38* (2013.01); *E01C 19/40* (2013.01); *E01C 19/402* (2013.01); *E04F 21/242* (2013.01); *E04G 21/066* (2013.01); *H02K 5/1735* (2013.01); *H02K 5/24* (2013.01); *H02K 7/063* (2013.01); *H02K 7/085* (2013.01); *H02K 7/145* (2013.01); *H02K 11/0094* (2013.01)

(58) Field of Classification Search
CPC ........ H02K 5/1735; H02K 5/24; H02K 7/061; H02K 7/063; H02K 7/065; H02K 7/145; E04F 21/242; E04G 21/066; E01C 19/32; E01C 19/35; E01C 19/38; E01C 19/402; E01C 19/40; B28B 1/29
USPC .................................................. 404/113, 114
See application file for complete search history.

(56) References Cited

U.S. PATENT DOCUMENTS 2,989,869 A * 6/1961 Hanggi ................... B06B 1/164
404/113
3,188,054 A * 6/1965 Mason, Jr. ................ B06B 1/16
366/121

(Continued)

*Primary Examiner* — Raymond W Addie
(74) *Attorney, Agent, or Firm* — AnnMarie W. Whitley; Whitley Legal Group, PC

(57) ABSTRACT

A remote controlled vibration imparting device for a concrete finishing tool includes a case that attaches to a float using standard bolt layouts. A motor housing is suspended in and attached to the case, and the motor housing partly surrounds a vibrator with a support, a rotor with a shaft and weighted body, a bi-directional motor, and a coupler between the shaft and the motor. Also in the case are a variable speed controller and a remote switch, both of which are electrically connected to the motor and a battery located on or in the case. The case further includes a removable lid that attaches to a concrete finishing tool.

20 Claims, 15 Drawing Sheets

Related U.S. Application Data which is a continuation-in-part of application No. 15/208,423, filed on Jul. 12, 2016, now Pat. No. 9,719,215, which is a continuation-in-part of application No. 14/829,394, filed on Aug. 18, 2015, now Pat. No. 9,397,531, which is a continuation of application No. 14/304,019, filed on Jun. 13, 2014, now Pat. No. 9,139,966, and a continuation-in-part of application No. 13/947,720, filed on Jul. 22, 2013, now abandoned, said application No. 14/304,019 is a continuation-in-part of application No. 13/947,720, filed on Jul. 22, 2013, now abandoned.

(60) Provisional application No. 62/482,339, filed on Apr. 6, 2017.

(51) Int. Cl.
*H02K 7/14* (2006.01)
*H02K 11/00* (2016.01)
*H02K 5/173* (2006.01)
*H02K 7/08* (2006.01)

(56) References Cited

U.S. PATENT DOCUMENTS

| | | | | |
|---|---|---|---|---|
| 4,431,336 | A * | 2/1984 | Nightengale | B06B 1/161 404/114 |
| 5,234,283 | A * | 8/1993 | Adkins | E01C 19/402 404/114 |
| 5,632,569 | A * | 5/1997 | Szmansky | E01C 19/43 15/235.4 |
| 6,139,217 | A * | 10/2000 | Reuter | E01C 19/402 404/114 |
| 6,374,569 | B1 * | 4/2002 | Suckow | E01C 19/402 15/235.4 |
| 7,465,121 | B1 * | 12/2008 | Hendricks | E04F 21/242 15/235.4 |
| 8,230,760 | B1 * | 7/2012 | Breeding | E04G 21/08 366/108 |
| 2005/0036837 | A1 * | 2/2005 | Marshall | B25F 5/00 404/114 |
| 2008/0050177 | A1 * | 2/2008 | Sager | E04F 21/163 404/112 |
| 2012/0183351 | A1 * | 7/2012 | Brening | E01C 19/38 404/114 |
| 2013/0223929 | A1 * | 8/2013 | Stephens | C04B 28/02 404/75 |

* cited by examiner

BI-DIRECTIONAL VIBRATOR MECHANISM USABLE WITH A CONCRETE FINISHING TOOL

CROSS-REFERENCE TO RELATED APPLICATIONS

This application claims the benefit of co-pending provisional U.S. Application 62/482,339 filed Apr. 6, 2017 and is a continuation-in-part of co-pending U.S. application Ser. No. 15/634,980 filed Jun. 27, 2017. Co-pending U.S. application Ser. No. 15/634,980 is a continuation-in-part of U.S. Pat. No. 9,719,215 issued Aug. 1, 2017, and U.S. Pat. No. 9,719,215 is a continuation-in-part of U.S. Pat. No. 9,397,531 issued Jul. 19, 2016. U.S. Pat. No. 9,397,531 is a continuation-in-part of U.S. patent application Ser. No. 13/947,720 filed Jul. 22, 2013 and a continuation of U.S. Pat. No. 9,139,966 issued Sep. 22, 2015, which is also a continuation-in-part of U.S. patent application Ser. No. 13/947,720 filed Jul. 22, 2013.

FIELD OF THE INVENTION

The present invention relates to novel and useful bi-directional vibration departing devices for concrete finishing tools.

BACKGROUND OF THE INVENTION

Concrete finishing tools, such as floats, jointers, screeds and the like, are used to provide a particular finished surface adjusted to a freshly poured concrete mass. In the conventional method of use of such concrete finishing tools, an operator moves the tool across the surface of the freshly poured concrete, usually in a back and forth manner, before the concrete mass cures or dries.

It has also been recognized that the addition of a vibratory action to the concrete finishing tool aids in the creation of a surface, characteristic, such as a smooth surface and in the case of a jointer, possesses a groove to control cracking of the finish concrete slab. Vibration devices for concrete finishing tools are useful for this purpose and include those where an external motor is mounted to a handle or shaft and linked to a remote vibration mechanism by the use of a cable or gear mechanism and where a power source is placed within the handle of the concrete finishing tool and provides power to vibrators that are located atop of the head of the finishing tool adjacent the concrete. Additionally, some concrete finishing tools include a vibrator that is placed within the handle structure of the tools and powered by a battery that is also found in the handle. These vibration devices and tools do not account for controlling the vibration within the handle, other than by control of electrical power to the vibrating mechanism. These tools also do not provide assistance to the operator for propelling the concrete finishing tool in multiple directions.

A vibration imparting device for a concrete finishing tool that is self-contained and between the handle and terminus of the concrete finishing tool and allows for optimum vibration of the vibrating mechanism would be a notable advance in the construction arts. Additionally, a vibration imparting tool that is self-contained and sits between the terminus of a concrete finishing tool pole and a cooperating float would all be an advancement in the construction arts. Moreover, a vibration imparting device that further assists the operator in propelling the concrete finishing tool forward and backward would further be a notable advance in the construction arts.

SUMMARY OF THE INVENTION

In accordance with the present invention several embodiments of a novel and useful vibration imparting device for a concrete finishing tool are herein provided.

In a first embodiment of a vibrator assembly, a housing forms a chamber formed and defined by an inner surface or wall of the housing. The housing is sized to accommodate a vibrator and an electrical battery to provide electrical power to the vibrator, and the vibrator can be selectively powered by the battery either with a switch physically present on the device or by remote control. The vibrator, positioned within the chamber of the housing, includes a resilient collar that surrounds and contacts the vibrator in the housing inner wall. The resilient collar forms a spaced relationship between the vibrator and the housing inner surface within the chamber. In addition, an anchor holds the vibrator within the chamber in the spaced relationship formed by the collar lying between the housing inner surface and the vibrator. The vibrator assembly can be attached along the pole or tube of a concrete finishing tool, for example between its handle and terminus, according to an embodiment of the present invention. A first adaptor removably connects the housing to the handle of the concrete finishing tool, while a second adaptor removably connects the housing to the terminus of the concrete finishing tool. At least one spacer is interposed the electrical battery and the housing inner wall. A holder is also used to fix the electrical battery within the housing chamber. In this manner, the spacer and the holder obviates damage to the battery due to the vibratory motion and imparted by the vibrator.

Another embodiment of the vibrator assembly includes a vibrator mechanism that may be employed with the housing and the first and second adaptors connecting the housing to the handle and the terminus of the concrete finishing tool or with other arrangements for use with a concrete finishing tool. The vibrator mechanism utilizes a support that is located within the chamber of the housing. The support is formed with a bore through the same. A rotor is located within the bore of the support and is adapted to turn or rotate relative to the support. The rotor also includes a shaft that extends outwardly from the rotor, as well a weighted body that is connected to the rotor apart from the shaft, producing vibration. The vibrator mechanism is also provided with a motor having an output shaft and utilizes a source of energy, such as the battery prior described. A resilient link, such as a spring or a coupler connects the outward shaft of the motor to the shaft of the rotor that extends from the support. Such vibrator mechanism also may include a resilient band, such as an "O" ring, that at least partially surrounds the outer surface of the support and contacts the inner surface of the housing. Vibrations are transmitted to the housing from the rotor via such resilient band.

Another embodiment of the present invention incorporates components or aspects of the vibrator mechanism and vibrator assembly and concerns a bi-directional vibrator mechanism which may be employed with a case that attaches to a standard float using industry standard float adapter bolt layouts. The case houses or supports a motor housing, a rechargeable battery or a female socket to receive a rechargeable battery, a receiver and antenna, and optionally a variable speed motor controller and a variable speed input. The receiver and antenna are coupled to the motor and receive instructions from a remote device regarding what direction to engage the motor. The optional variable speed motor controller is also coupled to the motor and receives input from the variable speed input regarding at what speed the motor should operate. The rechargeable battery likewise is coupled to the motor to provide power necessary to operate the motor. Preferably, the case in this embodiment has a rectangular footprint, defines openings for connectors and inputs, and preferably includes a removable lid. The motor housing is removably secured in the case preferably with a rubber gasket sandwiched between the motor housing and the case or by resting on and attaching to a plurality of pillars within the case to prevent direct contact between the housing and case. The motor housing contains the bi-directional vibration mechanism, which includes a bi-directional motor as well as at least one output shaft having a first end and a second end. Optionally, the motor housing contains two output shafts, a first output shaft and a second output shaft, positioned on opposite ends of the motor. The first or only output shaft couples to a first coupler that also couples to a first rotor shaft, which is part of a first rotor. Where there is a second output shaft, the second output shaft couples to a second coupler that also couples to a second rotor shaft, which is part of a second rotor. First rotor and optional second rotor are located within the motor housing and further include first and second weighted bodies respectively connected either directly to the first and second rotor shafts or apart from the first and second rotor shafts, producing vibrations. First and second rotors are adapted to turn or rotate relative to the motor housing. Operationally, the bi-directional motor can be operated in either a first or second direction so that the attached float is propelled either forward or backward.

The case for the bi-directional vibrator system of the present invention preferably attaches to the float on one side and to a float knuckle adaptor on an opposite side. The float knuckle adaptor is configured to accept poles or tubes commonly used to push and pull a float when finishing concrete. Additionally, support pillars are positioned in the case to provide additional support between the float side of the case and the float knuckle adaptor side of the case.

For a better understanding of the invention reference is made to the following detailed description of the preferred embodiments of the invention which should be taken in conjunction with the above described drawings.

DETAILED DESCRIPTION OF THE INVENTION

Various aspects of the present invention will evolve from the following detailed description of the preferred embodiments thereof which should be referenced to the prior described drawings. FIGS. 1-12 illustrate embodiments of a vibrator assembly and mechanism and how they can be configured to attach to a concrete finishing tool 12 along a pole or tube having a handle and terminus. FIGS. 13-24 illustrate how embodiments of the vibrator assembly and mechanism can be further configured to attach to a concrete finishing tool between the terminus of a pole or tube and the float and in a manner to facilitate bi-directional operation.

Figure 1:
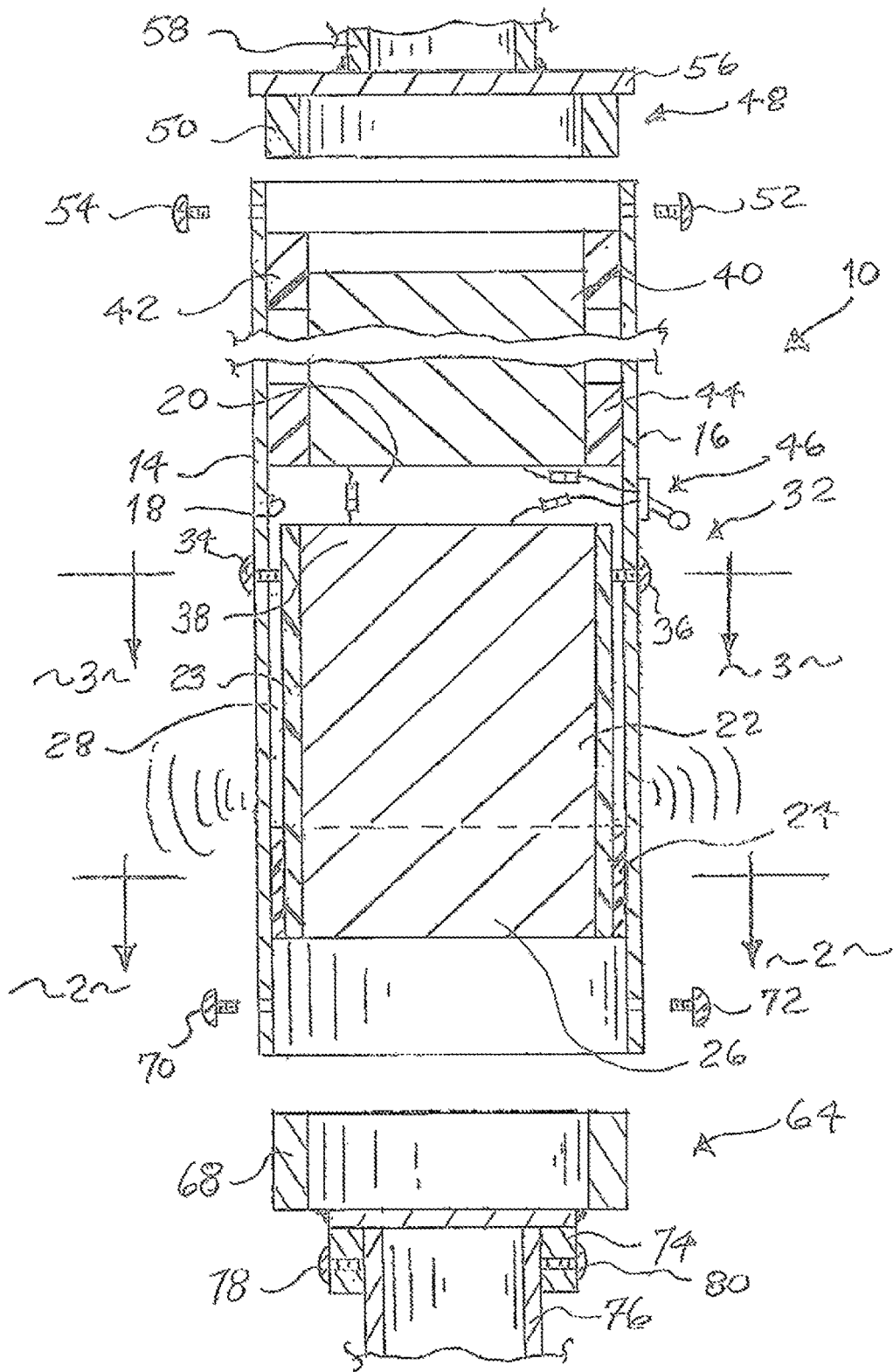
FIG. 1 is a partially exploded and broken sectional view of a vibration imparting device for use with the present invention interposed the handle and the terminus of a concrete finishing tool.
Figure 2:
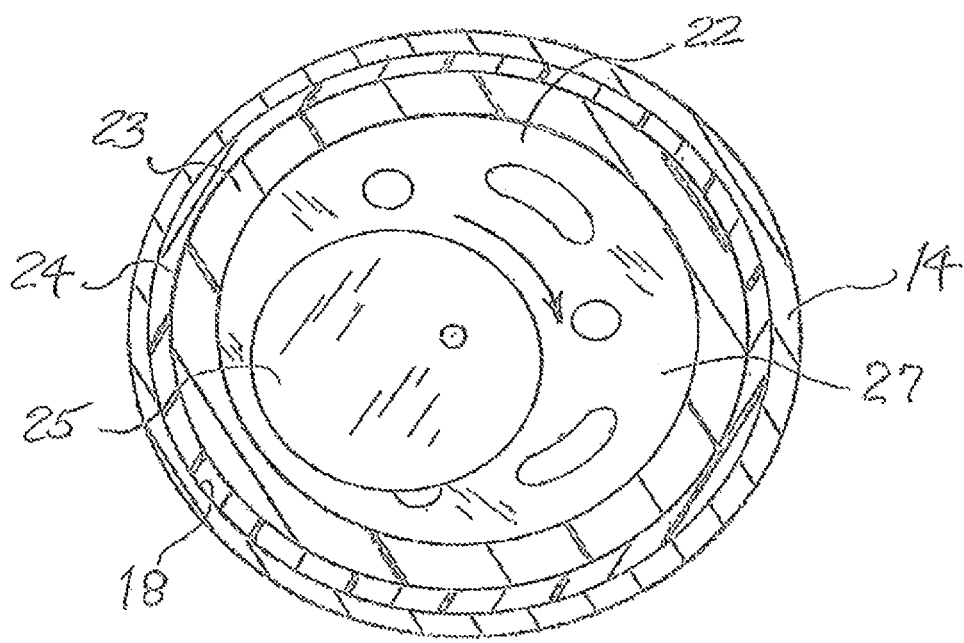
FIG. 2 is a sectional view taken along line 2-2 of FIG. 1.

An embodiment of a vibrator mechanism as whole and as configured to be inserted along the pole or tube of a concrete finishing tool is depicted in the drawings by reference character 10. Device 10 is intended to impart vibration to a concrete finishing tool 12 shown in FIG. 4. As shown in FIG. 1, device 10 includes, as one of its elements, a housing 14 which may take the form of a cylindrical tube formed of any rigid or semi-rigid material, such as metal, plastic, wood, and the like. For example, aluminum tubing suffices in the construction of housing 14. Housing 14 is sized to accommodate installation in existing concrete finishing tools, which will be discussed in greater detail as the specification continues.

Figure 3:
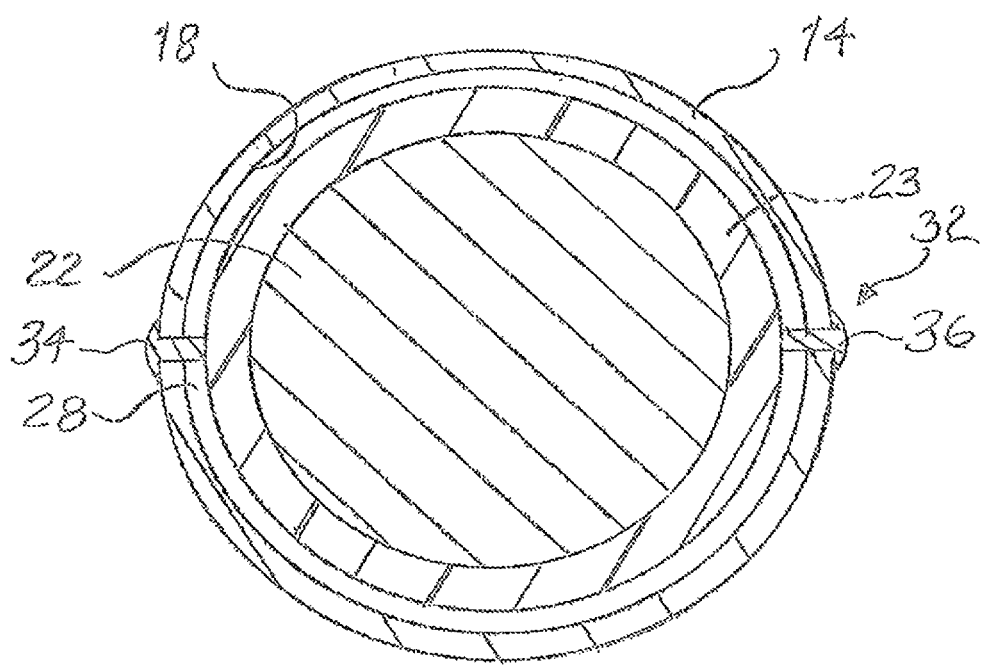
FIG. 3 is a sectional view taken along line 3-3 of FIG. 1.

Again, referring to FIG. 1, it may be observed that a vibrator 22 is positioned within chamber 20 of housing 14. Vibrator 22 may take the form of a vibrator sold under the designation "Grand Daddy Vibrator", model number TS770, 4.0-14 VDC, 1.4 inches diameter, sold by Surplus Traders, New York City, N.Y. Most importantly, vibrator is supported within chamber 40 by a resilient collar 24 which extends around vibrator 22 at end 26 thereof. Collar 24 may be constructed of rubber, plastic or other like material. Resilient collar 24 forms a space 28 between inner walls or surface 18 of housing 14 and vibrator 22, FIGS. 1 and 2. Thus, the vibrations indicated by vibration lines 30, FIG. 1, imparted by vibrator 22 are transmitted to housing 14 and to terminus of a finishing tool connected to housing 14 via resilient collar 24. As may be apparent from FIG. 2, vibrator 22 includes an outer plastic sheath 23 that directly contacts resilient collar 24. In addition, eccentric disc 25 of vibrator 22 is shown extended from motor plate 27. Eccentric disc turns per directional arrow 29 in creating vibrations. The connection of housing 14 to a concrete finishing tool 12 will be discussed hereinafter. An anchor 32 maintains the establishment of space 28 between vibrator 22 and housing 14. Anchor 32 is shown in FIGS. 1 and 3 as set screws 34 and 36 which extend through housing 14 and bear against end 38 of vibrator 22. In this manner, vibrator 22 is biased to move at end 26, nearest to finishing tool terminus 66, FIG. 4. Contact of vibrator 22 directly to inner surface 18 of housing 14 would greatly impede the imparting of vibration to finishing tool 12.

Figure 10:
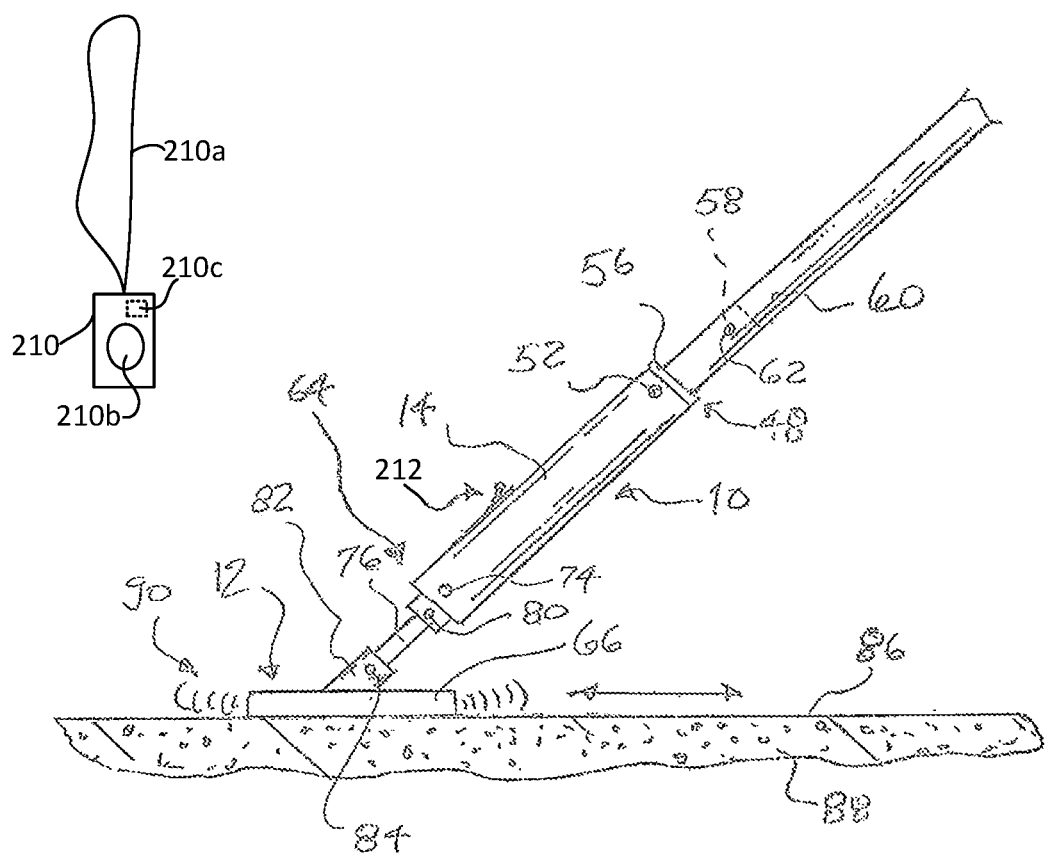
FIG. 10 is a side partial elevational view of a concrete finishing tool incorporating the vibrating mechanism of the present invention and a remote activation device.

Returning to FIG. 1, it may be seen that an electrical battery 40 is also located in chamber 20 of housing 14. Electrical battery may take the form of a 14.4 volt NiCAD, 12 cell, 4,000 MAH, item number TEC90012, available from Batteries Plus of Rocklin, Calif. Battery 40 is positioned or fixed within chamber 20 against movement by the friction of spacers 42 and 44 mounted to the end portions of electrical battery 14. Consequently, electrical battery 14 fits snuggly within chamber 20 of housing 14. However, additional screws may be passed through housing 14 to engage spacers 42 and 44 to prevent slippage of electrical battery 40 within chamber 20 (not shown). An electrical switch and conventional connectors 46 electrically connect electrical battery 40 to vibrator 22 and permit the selective activation of vibrator 22 from the exterior of housing 14. Alternatively and preferably, as shown in FIG. 10, electrical switch may comprise a wirelessly-operated switch 212 that wirelessly communicates with an activation device 210. Activation device 210 preferably comprises a wireless transmitter 210c for transmitting a wireless signal to switch 212 and a button 210b, microphone, sensor, or other component that allows the operator of the tool to instruct that a wireless signal be transmitted. Switch 212 likewise comprises a receiver for receiving the wireless signal from activation device 210. Activation device 210 may be worn by the operator of the tool such as with a lanyard 210a as shown in FIG. 10 or it may be handheld, attached to another device, or otherwise remotely located.

A first adaptor 48 is also found in device 10 and includes a flange 50 that fits within chamber 20 within housing 14. Set screws 52 and 54 extending through housing 14 engage flanges 50 when it is placed within chamber 14 in order to hold first adaptor to housing 14. First adaptor also includes a plate 56 and a tube 58 which is welded to plate 56. Tube 58 is intended to be connected to the handle 60 of concrete finishing tool 12, FIG. 4, and, in the embodiment depicted in the drawings, serves as a female end to device 10. A set screw 62 passes through handle 60 and engages tube 58 in order to hold device 10 to handle 60.

Figure 4:
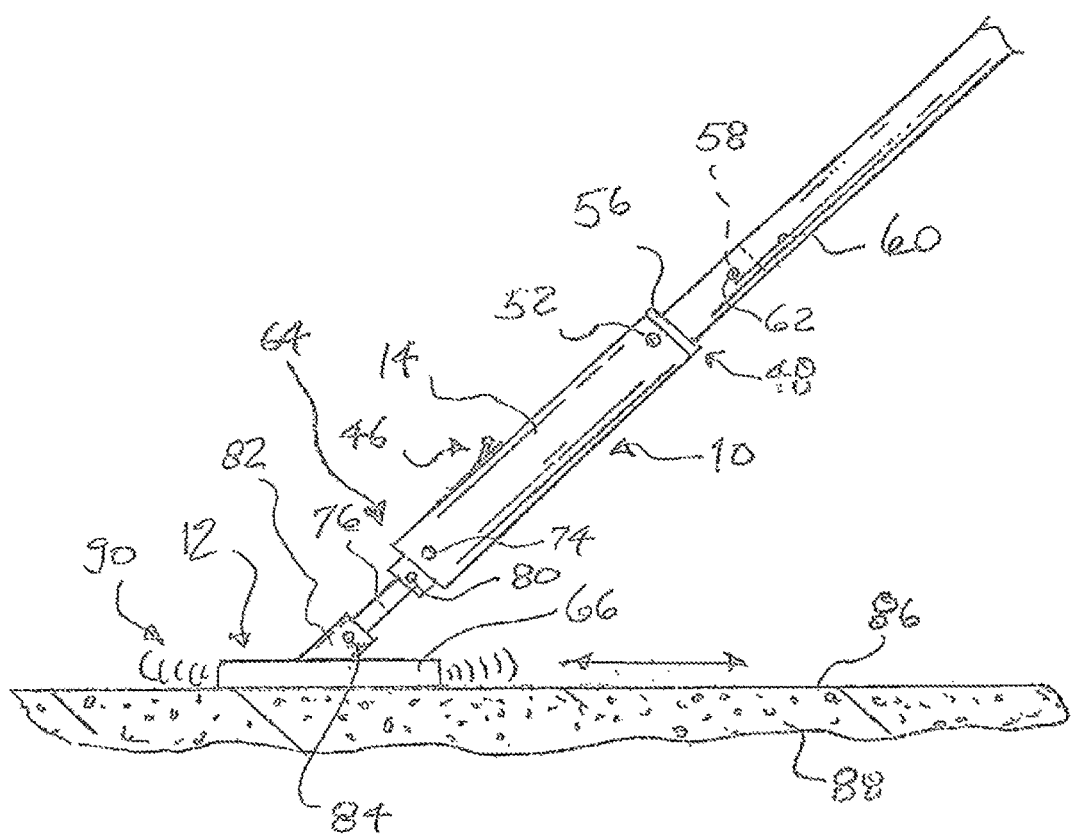
FIG. 4 is a side partial elevational view of a concrete finishing tool with a device for imparting vibration for use with the present invention installed along the handle and terminus of a concrete finishing tool.

A second adaptor 64, FIG. 1, connects device 10 to the terminus 66 of concrete finishing tool 12. Concrete finishing tool 12 is depicted in FIG. 4, as being a float. Adaptor 64 includes a flange 66 that fits within chamber 20 of housing 14 and is fixed there within by set screws 70 and 72. A hollow boss 74 is welded to flange 68 and includes a tube 76 which extends outwardly from the same. Set screws 78 and 80 hold tube 76 within hollow boss 74. Referring to FIG. 4, it may be observed that tube 76 serves as a male fitting and fits within a coupler 82 of concrete finishing tool terminus 66. A set screw 84 holds tube 76 to terminus 66 and, thus, holds device 10 to terminus 66. It should be realized that a conventional spring loaded button on tube 76 may interact with an opening in coupler 82 of terminus 66 to serve as a quick installing and removing mechanism in substitution for set screw 84.

Figure 5:
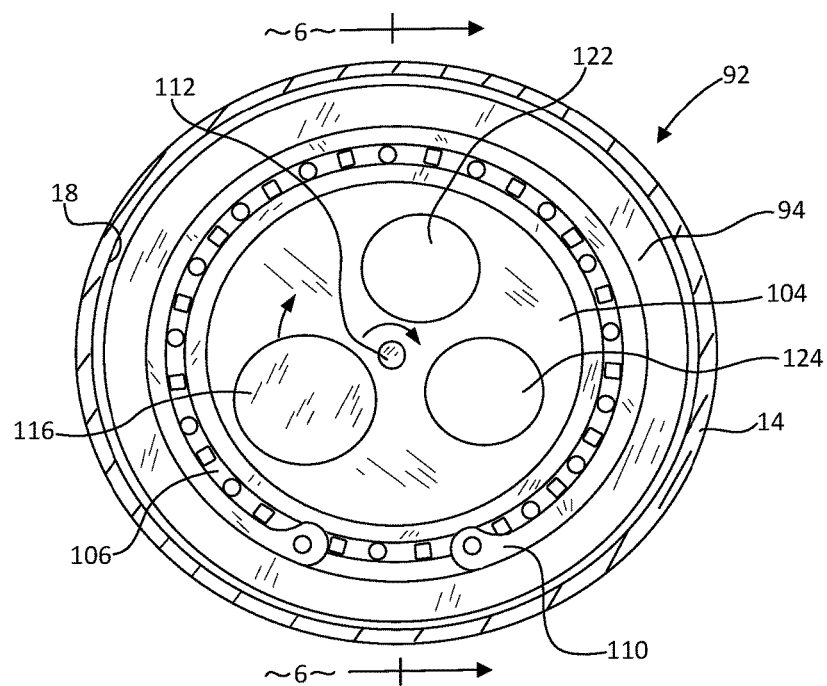
FIG. 5 is a front elevational view of another embodiment of a vibrator mechanism usable in the tool of the present application, with the housing depicted in section.
Figure 6:
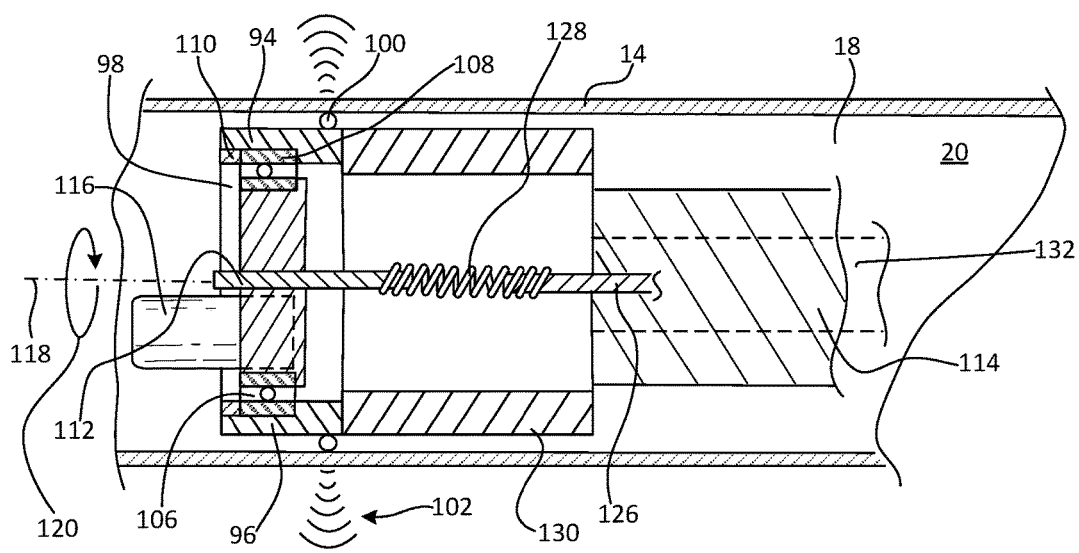
FIG. 6 is a sectional view taken along line 6-6 of FIG. 5.
Figure 7:
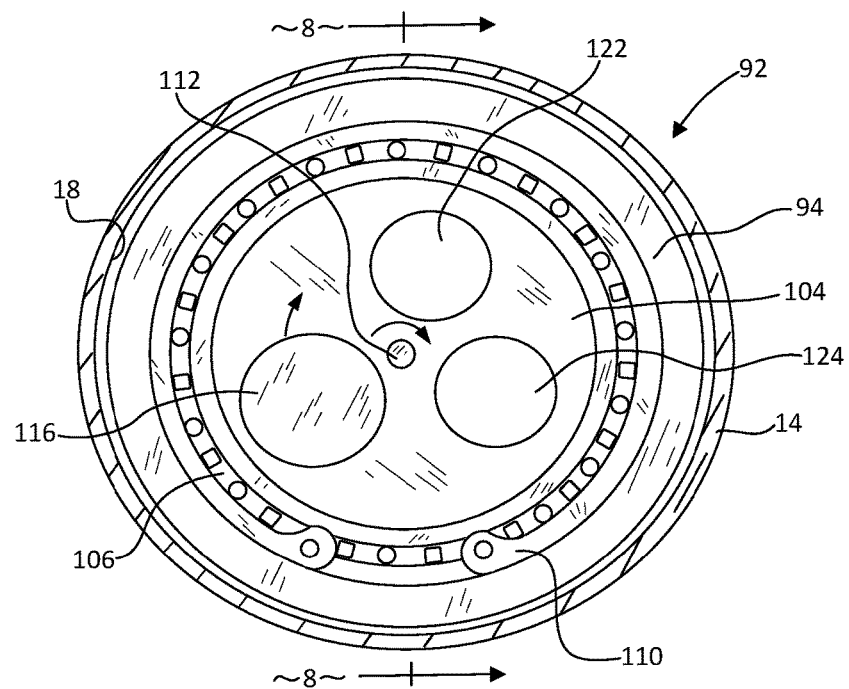
FIG. 7 is a front elevational view of another embodiment of a vibrator mechanism usable in the tool of the present application, with the housing depicted in section.

Viewing now FIGS. 5 and 6, another embodiment 92 of a vibrator mechanism is depicted. Vibrator mechanism 92 is employed as an alternate to the vibration imparting device 10 within housing 14, FIG. 1. In other words, vibrator mechanism 92 would be used in device 10 in place of vibrator and motor 22 depicted in FIG. 1. Also, it should be realized that vibrator mechanism 92 would be connected to terminus 66 and handle 60 via the connection mechanism depicted in FIGS. 1-4 for use in concrete finishing tool 12 along its pole or tube used for pushing and pulling the tool. Vibrator mechanism 92 includes as one of its elements a support 94 which is located within housing chamber 20. Support 94 includes an outer surface 96 and a bore 98 there through. "O" ring 100 serves to transmit vibration from vibration mechanism 92 to housing 14 as part of the concrete finishing tool 14 when used with wet concrete, schematically illustrated by vibration lines 102, FIG. 6.

Figure 8:
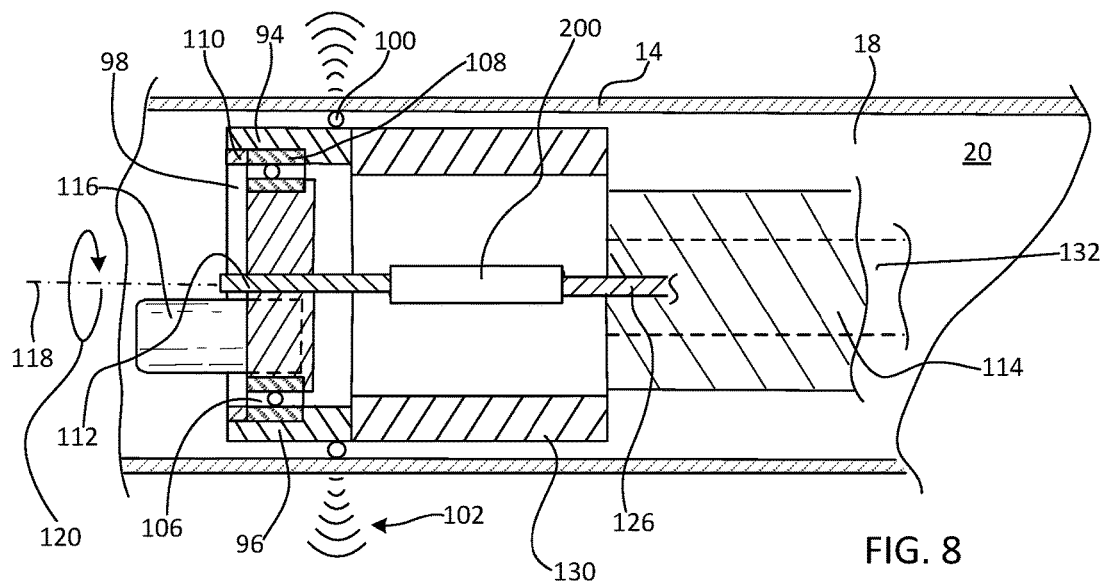
FIG. 8 is a sectional view taken along line 8-8 of FIG. 7.
Figure 9:
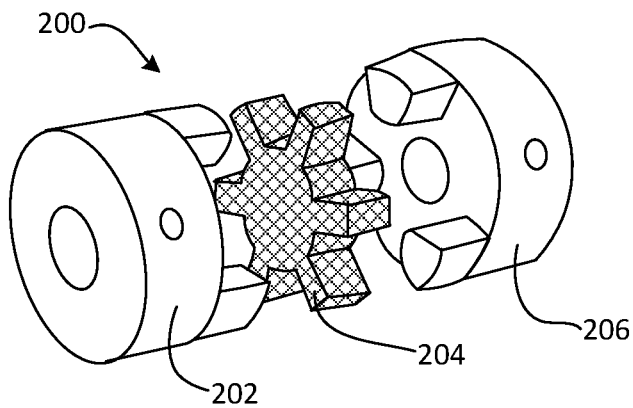
FIG. 9 is a perspective view of a coupler useful with the embodiment shown in FIG. 7.
Figure 11:
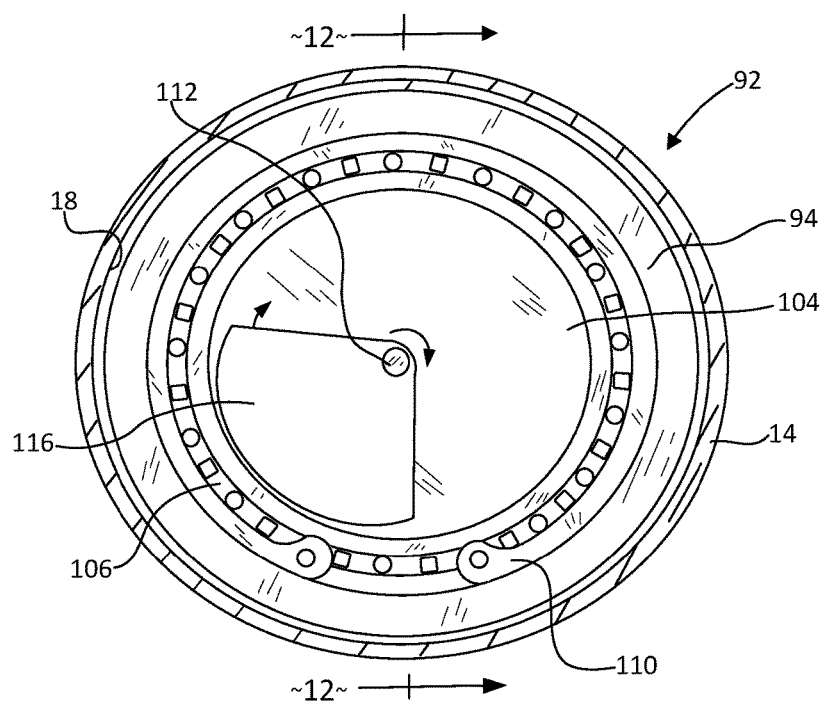
FIG. 11 is a front elevational view of another embodiment of a vibrator mechanism usable in the tool of the present application, with the housing depicted in section.
Figure 12:
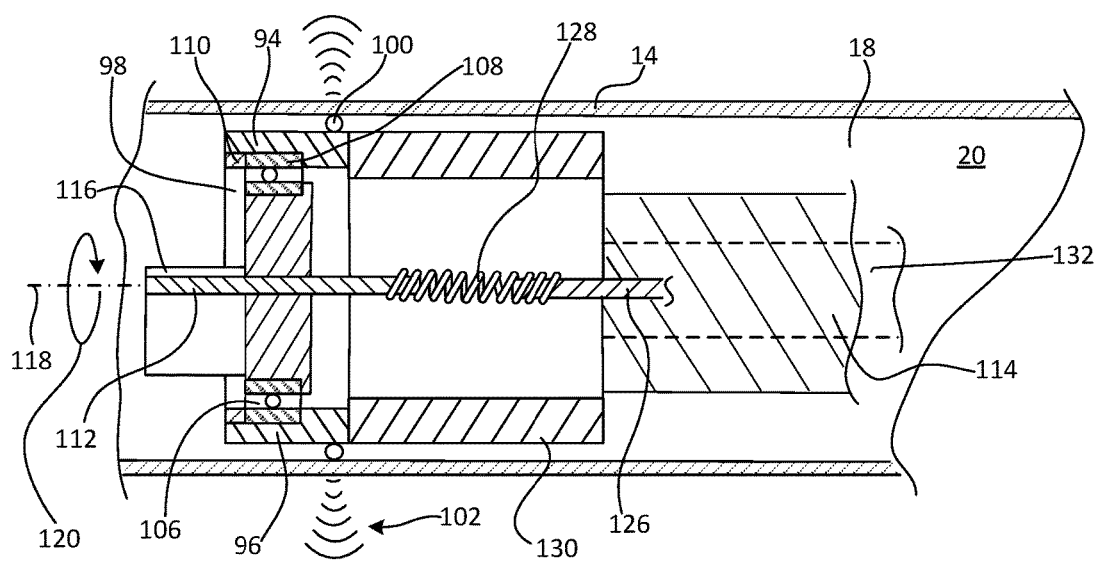
FIG. 12 is a sectional view taken along line 12-12 of FIG. 11.

Referring again to FIGS. 5 and 6, a rotor 104 lies within bore 98 of support 94. A roller bearing 106 interspaces roller bearing 106 and support 94. Specifically, roller bearing 106 lies against a shoulder 108 of support 94, best shown in FIG. 6, and a spring clip 110. Rotor 104 is also fashioned with a shaft 112 that extends into chamber 20 toward motor 114, which may be battery operated in the same manner as vibrator 22 depicted in FIG. 1. In addition, rotor 104 includes a weighted body 116 that is embedded in rotor 104 and lies apart from shaft 112 in an eccentric manner. Needless to say, shaft 116 rotates about an axis 118 according to directional arrow 120, FIG. 6, to generate vibrations. Openings 122 and 124 pass through rotor 122 and serve as access openings to chamber 20 of housing 14. Alternatively, as shown in FIGS. 11 and 12, in another embodiment of vibrating mechanism 92, weighted body 116 has a perimeter that is pie or wedge shaped, and shaft 112 extends at least partially through weighted body 116 or entirely through weighted body 116. In this embodiment, weighted body 116 is preferably press fit on top of a bushing (not shown) on shaft 112 and does not need to be embedded in rotor 104. This embodiment can be used with any type of resilient link 128 as described below, including a spring as shown in FIG. 6 or a coupler as shown in FIGS. 8 and 9. Further with the embodiment of vibrating mechanism 92 shown in FIGS. 11 and 12, openings 122 and 124 are optional.

Referring again to FIG. 6, it may be observed that motor 114 includes an output shaft 126. A resilient link 128 connects shaft 112 of rotor 104 to output shaft 126 of motor 114. For purposes of this invention, resilient link 128 may take the form of a coil spring as shown in FIG. 6, as a coupler 200 as shown in FIGS. 8 and 9, or as any other component capable of connecting two shafts in a resilient manner. For example, coupler 200 comprises a first coupling hub 202 with one or more teeth (not labelled) that connects to shaft 112 of rotor 104, a second coupling hub 206 with one or more teeth (not labelled) that connects to shaft 126 of motor 114, and a spider, star, or other elastomer insert 204 that fits between coupling hubs 202 and 206 and among their teeth to connect the two shafts while protecting motor 114 from the vibration generated by rotor 104 when it rotates. Useful couplers include, for example, plum couplers, spider couplers, flexible shaft couplers, disc couplers, and jaw couplers. Any resilient link that somewhat isolates motor 114 from rotating rotor 104, however, is acceptable. Mount 130 connects to support 94 and serves to hold motor 114 in place by a pair of flanges, one flange 132 being shown in phantom on FIGS. 6 and 8.

A resilient band, that may be in the form of an "O" ring 100, surrounds support 94 and contacts the inner surface 18 of housing 14 and the outer surface 96 of support 94. Vibrations generated by rotor 104 are transmitted from rotor 104 and rotor support 94 to housing 14.

In operation, for the embodiment shown in FIGS. 1-12, the user inserts device 10 between handle 60 and terminus 66 of concrete finishing tool, FIG. 4. Tube 58 of first adaptor 48 fits within hollow handle 60. Likewise, second adaptor 64 allows the connection of device 10 to terminus 66 of concrete finishing tool 10 by the use of a tube 76 which fits into hollow adaptor 84 of terminus 66. Set screws 62 and 84 connect adaptors 48 and 64 to handle 60 and terminus 66 of concrete finishing tool 12, respectively. Once device 10 is installed as shown in FIG. 4, the concrete finishing tool 12 is moved along the surface 86 of soft concrete mass 88 to effect the particular finish on surface 86. In the instance where concrete finishing tool is a float, as shown in FIG. 4, a smooth surface 86 is produced. However, other concrete finishing tools may be employed to produce a rough surface or to create grooves in concrete mass 80, as is the case with a jointer. Nevertheless, vibrations originated from vibrator 22 within casing 14 of device are biased for transmission through adaptor 64 to concrete finishing tool 12 is indicated by vibration lines 90.

In addition, device 10 would operate in a similar manner by the use of vibrator mechanism 92 depicted in FIGS. 5 and 6 in substitution for vibrator 22 by placing vibrator mechanism 92 within housing 14.

Figure 18:
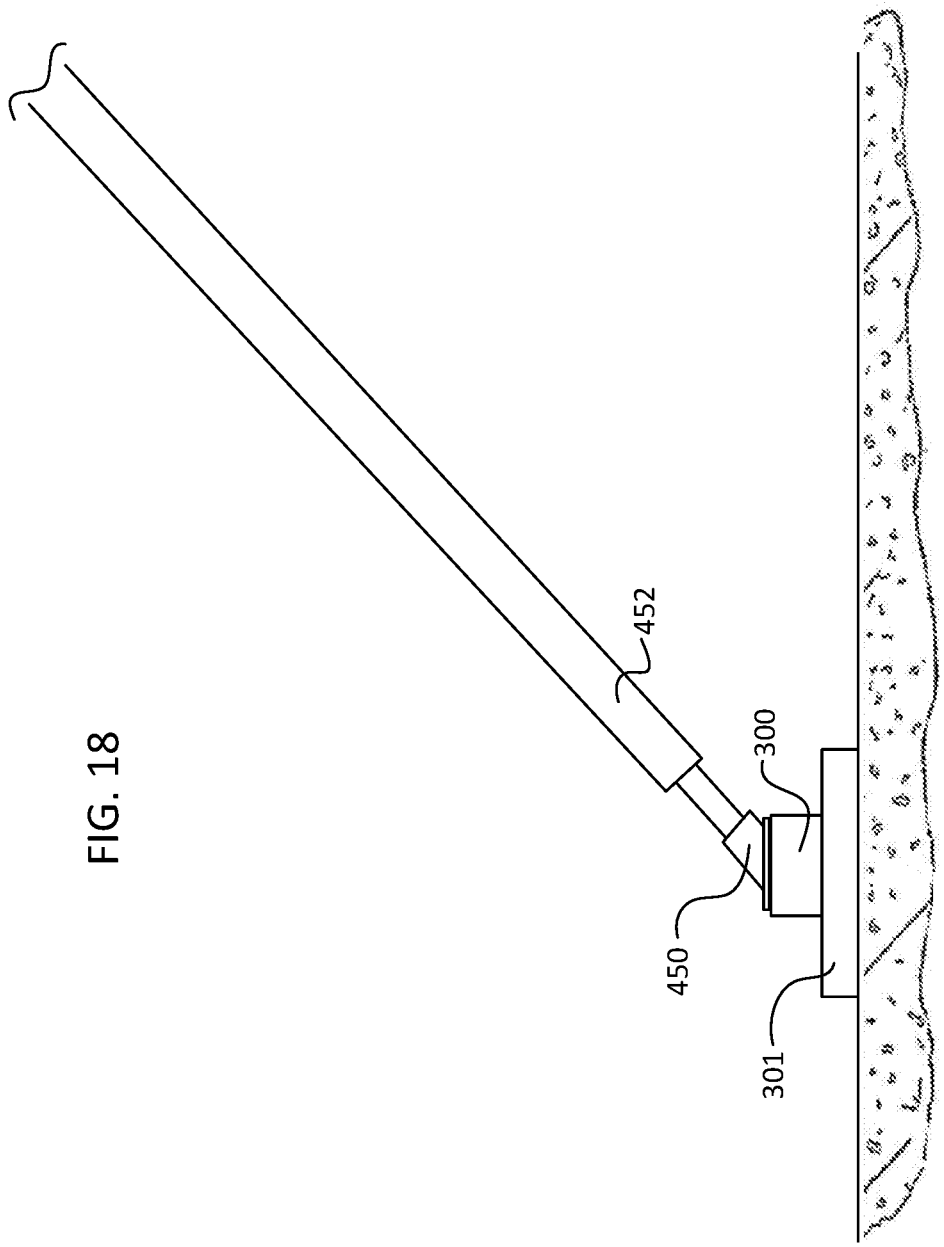
FIG. 18 is a side partial elevational view of a concrete finishing tool with the bi-directional device for imparting vibration of the present invention installed therein.
Figure 21:
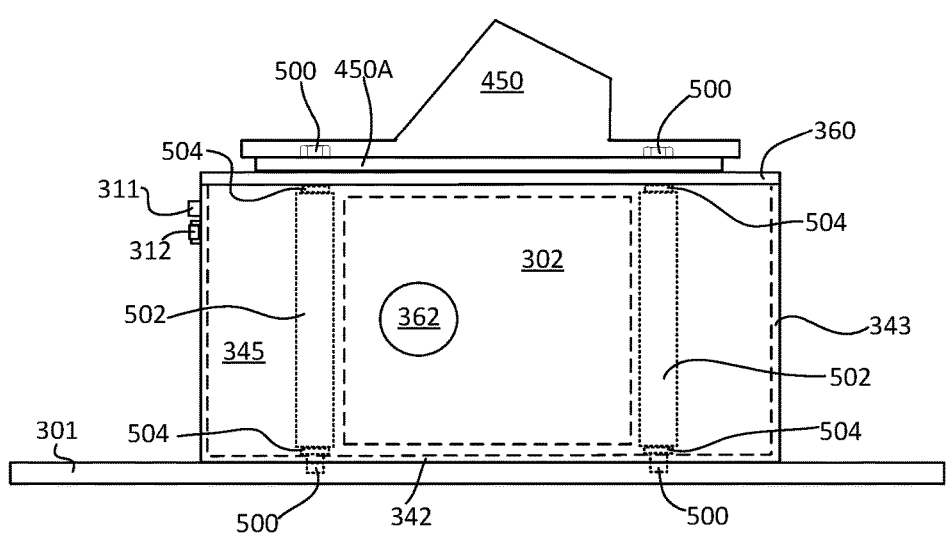
FIG. 21 is a side view of the embodiment shown in FIG. 19.
Figure 22:
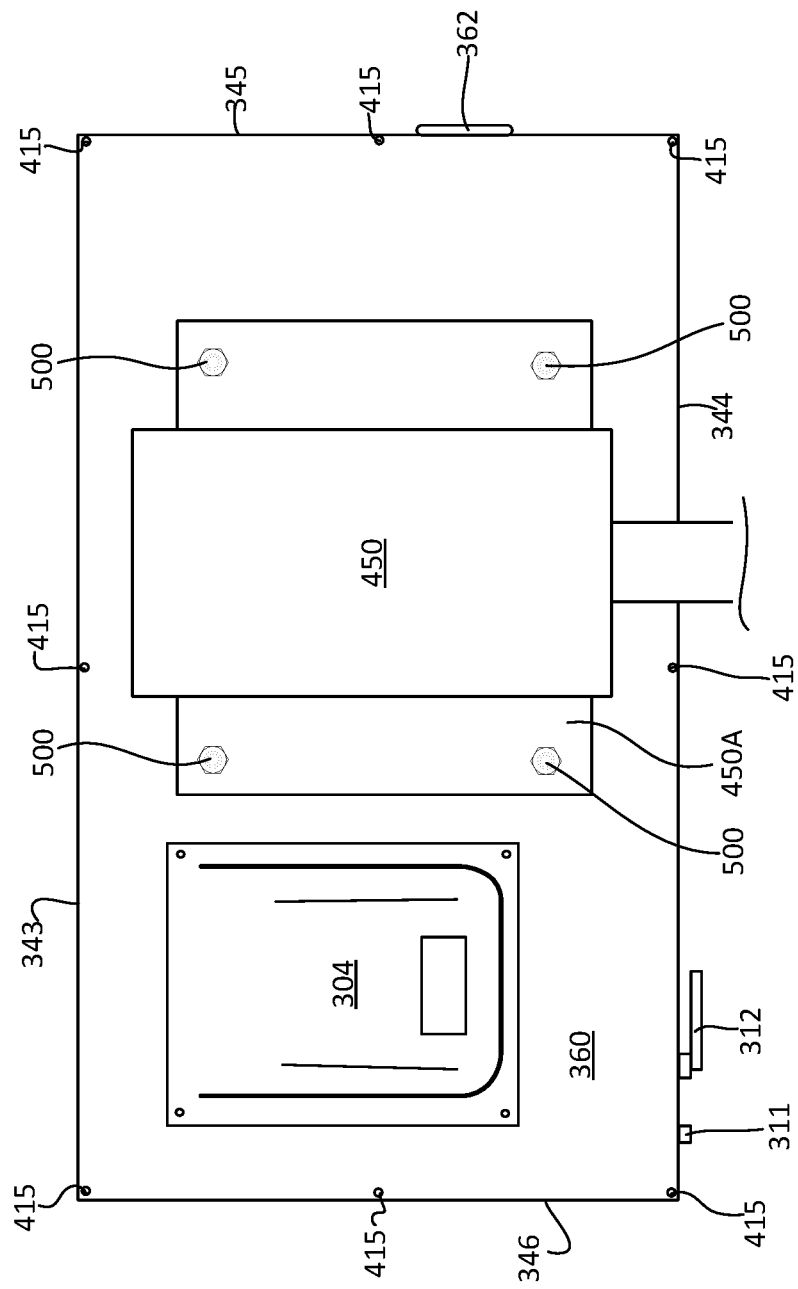
FIG. 22 is a top view of the embodiment shown in FIG. 19.

Additional embodiments of the present invention are shown in FIGS. 13-24. The additional embodiments concern a bi-directional vibrator mechanism that may be employed with a case 300 that attaches to a standard float 301 using industry standard float adapter bolt layouts. For example, case 300 attaches with bolts to float 301 using case or bolt openings 322 defined by case 300. Case 300 further attaches to a concrete finishing tool pole either directly or by using an adaptor. As shown in FIG. 18, case 300 preferably is positioned between the float 301 and an adaptor 450A or multiple adaptor components 450 and 450A and concrete finishing tool pole 452. As shown in FIG. 22, adaptor 450A includes connection points that correspond to industry standard float adaptor bolt layouts. Accordingly, a single bolt 500 can extend through and thereby connect the adaptor 45A to case 300 to float 301 at each bolt location according to the industry standard float adapter bolt layout, as shown in FIG. 21.

The case 300 houses or supports a motor housing 302, a rechargeable battery 304 or a female socket to receive a rechargeable battery 364, a receiver 310 and antenna 312, and an optional variable speed motor controller 306 and variable speed input 308. The receiver 310 and antenna 312 are coupled to and in electrical communication with the motor 114 using wires or couplers (not labelled) and wirelessly 401 receive instructions from a remote device 400 having a remote input 412 for selecting how to engage the motor 114. The receiver 310 may also include computing, communication, and control components necessary to control the vibrator mechanism and other components of the device. The receiver 310 also may incorporate the optional variable speed motor controller 306, or the optional variable speed motor controller 306 can be independently coupled to and in electrical communication with the motor 114 using wires or couplers (not labelled). There also can be multiple optional variable speed motor controllers so that one controls the speed when the device is being operated remotely and the other controls the speed when the device is being operated using inputs present on the device itself. The variable speed motor controller 306 preferably receives input from one or more variable speed inputs 308 regarding at what speed the motor 114 should operate or through an input on the remote device 400. The rechargeable battery 304 likewise is coupled to and in electrical communication with the motor 114 using wires or couplers (not labelled) to provide power necessary to operate the motor 114.

Figure 19:
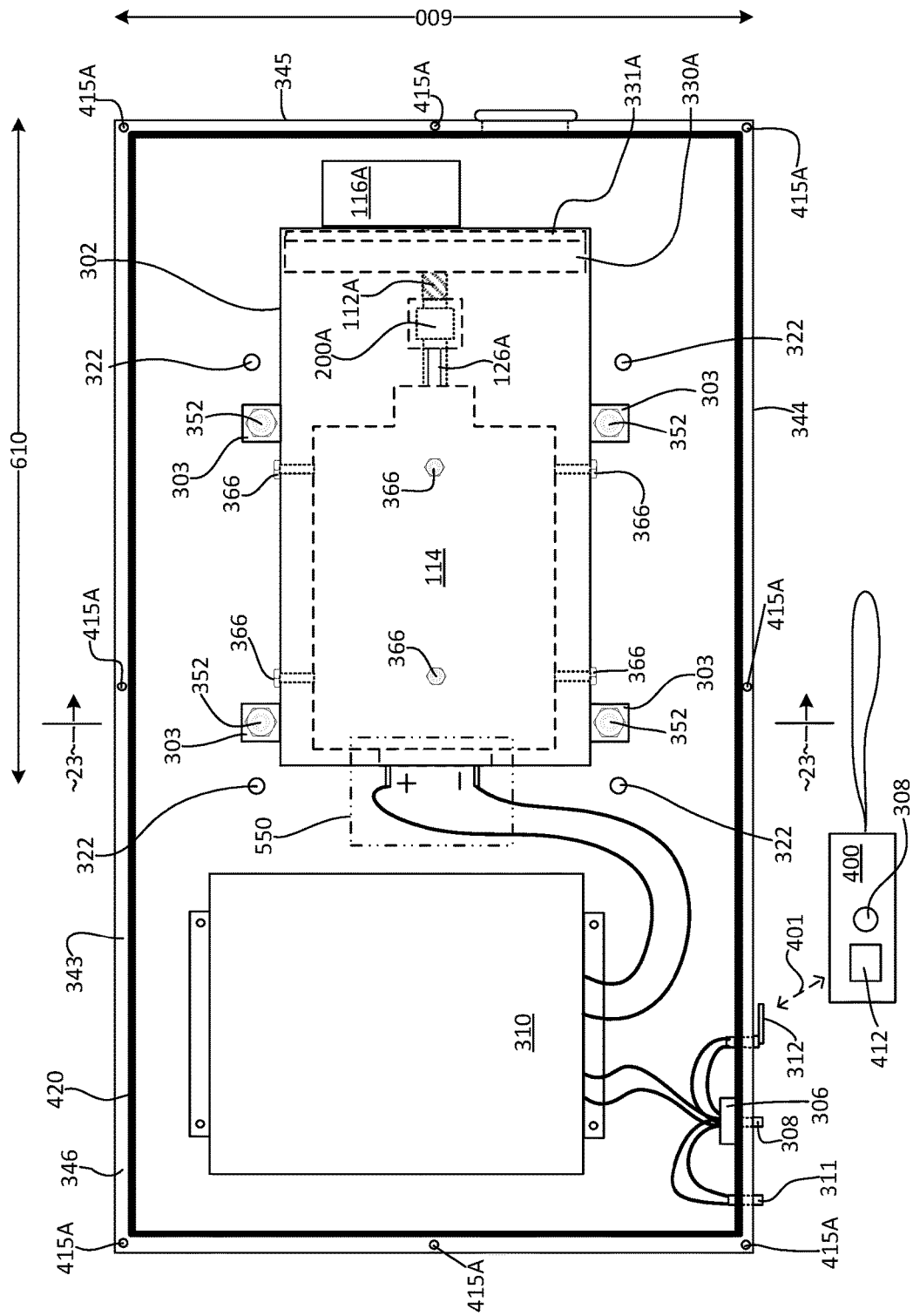
FIG. 19 is an overhead plan view of an alternate embodiment of the present invention where the tool is bi-directional and incorporates a first output shaft and a first rotor.
Figure 20:
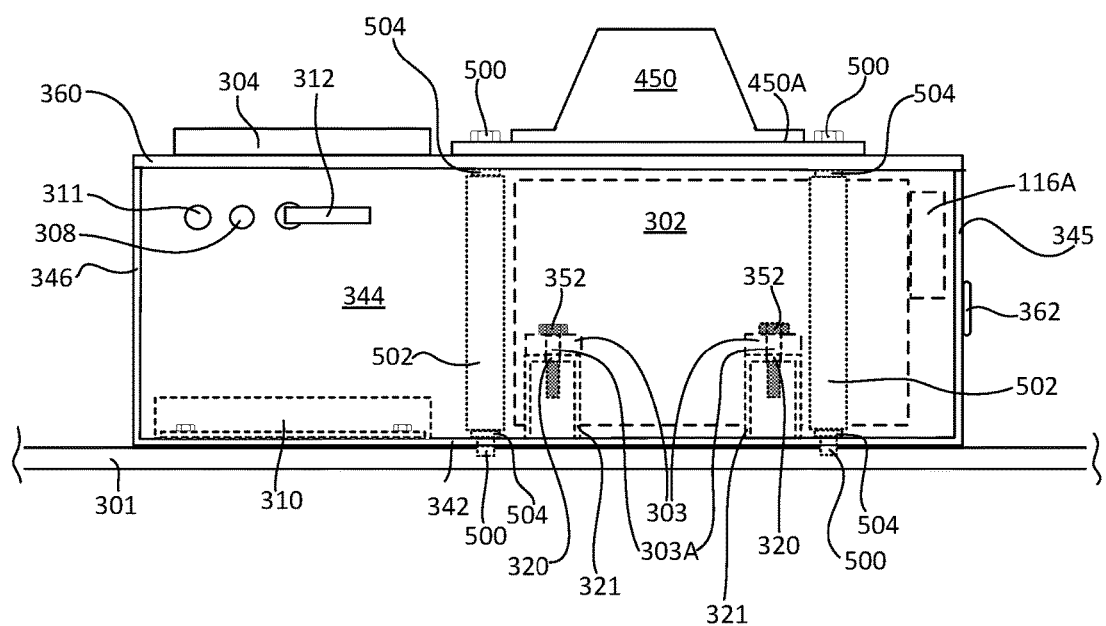
FIG. 20 is a back view of the embodiment shown in FIG. 19.

Preferably, the case 300 in this embodiment has a rectangular footprint, defines openings for connectors and inputs, and preferably includes a removable lid. The width 600 of each side of case 300 is preferably about 6.5 inches so it cooperates with general float dimensions, as shown in FIG. 19. Also preferably, a float adaptor or knuckle adaptor 450 can rest on top or be fixedly attached to case 300 as shown, for example, in FIG. 18. Float or knuckle adapter 450 allows a pole 452 to attach to the case and float so that the float can be pushed and pulled by an operator.

Figure 14:
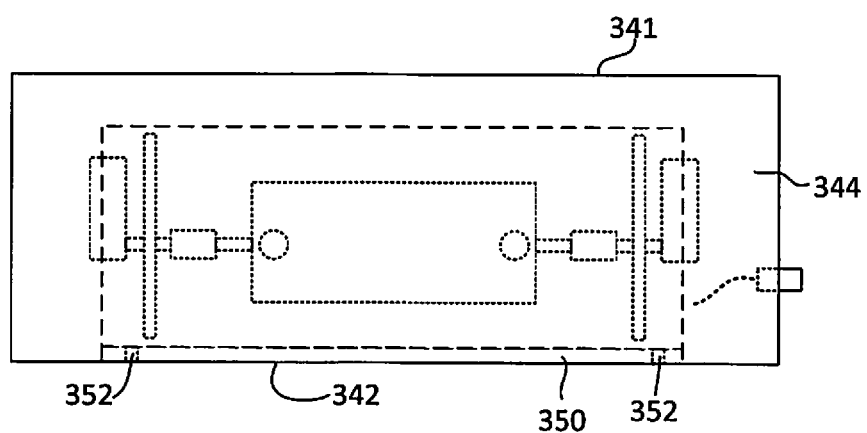
FIG. 14 is a back view of the embodiment shown in FIG. 13.
Figure 15:
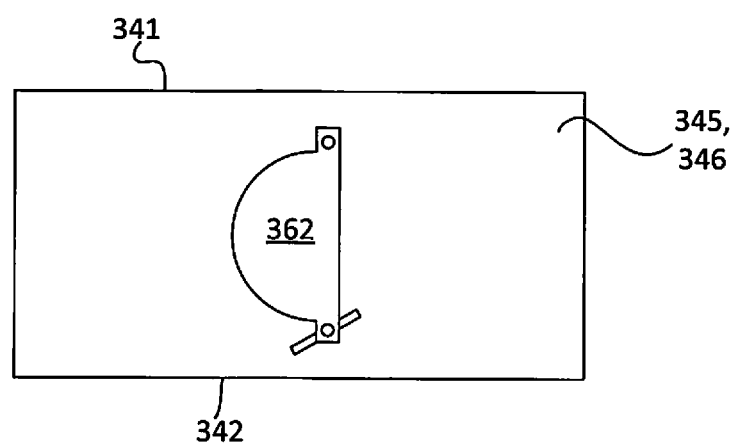
FIG. 15 is a side view of the embodiment shown in FIG. 13.
Figure 24:
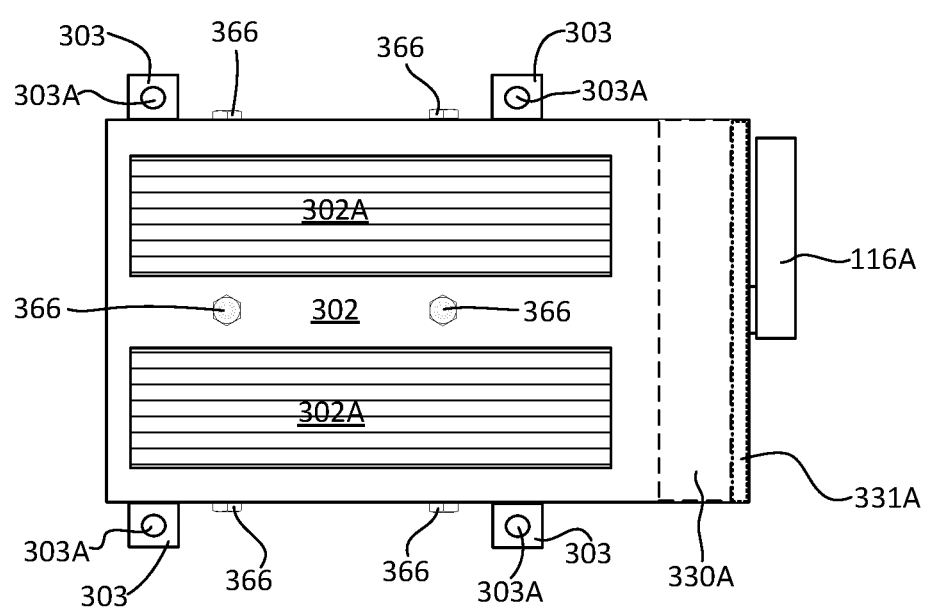
FIG. 24 is a side view of the housing shown in FIG. 24.

The motor housing 302 is removably secured in the case through openings 303A defined by the housing 302 with connectors 352 such as bolts and, as shown in FIG. 14, is further optionally secured with a rubber gasket 350 sandwiched between the motor housing 302 and the case 300 to prevent direct contact between the housing 302 and case 300 or, as shown in FIG. 24, is suspended between elevated sections or pillars 321 of case 300, where the pillars define openings 320.

The motor housing 302 contains the bi-directional vibration mechanism, which includes the motor 114, which in this embodiment is preferably a bi-directional motor such that it can produce both clockwise and counter-clockwise rotation. Preferably, the bi-directional motor, by rotating clockwise and counter-clockwise, facilitates movement of the attached float forward or backward depending on the rotation of the motor. Bi-directional motor 114 is preferably positioned and secured with set screws 366 and further includes a first output shaft 126A as shown in FIGS. 18-24. Optionally, bi-directional motor includes two output shafts, a first output shaft 126A and a second output shaft 126B, positioned on opposite ends of the motor 114 as shown in FIGS. 13-17. For ease of description, for the embodiment where two output shafts are described and where first and second output shafts 126A and 126B are discussed, it should be assumed they could instead be a first end of a single output shaft and a second end of a single output shaft respectively. The preferred embodiment is shown in FIGS. 18-24 where the vibration mechanism includes motor 114 and one output shaft 126A, and the preferred configuration for the motor 114, coupler, and rotor are consistent with what is discussed above with respect to FIGS. 9-12.

The first output shaft 126A couples to a first coupler 200A that also couples to a first rotor shaft 112A, which is part of a first rotor. The preferred embodiment for the rotor for the vibration mechanism of the present invention is to have only a first rotor shaft 112A and first rotor. For embodiments having two output shafts, as shown in FIGS. 13-17, the second output 126B shaft couples to a second coupler 200B that also couples to a second rotor shaft 112B, which is part of a second rotor. First and second couplers 200A and 200B can be any type of coupler or resilient link as discussed above with respect to vibrating mechanism 92. Preferably, first and second couplers 200A and 200B are coupler arrangements such as the one illustrated in FIGS. 8 and 9.

Figure 13:
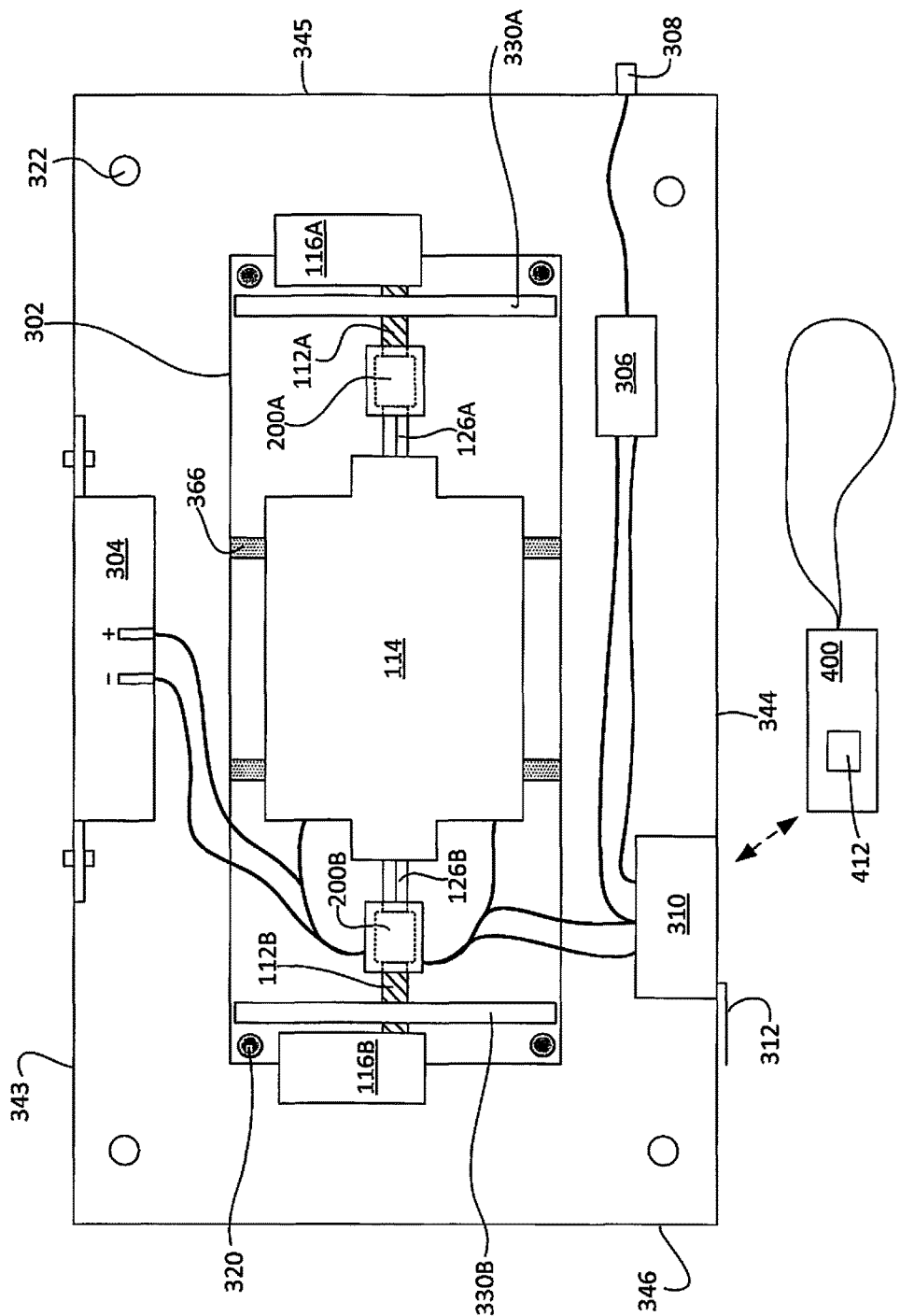
FIG. 13 is an overhead plan view of an embodiment of the present invention where the tool is bi-directional and incorporates first and second output shafts and first and second rotors.
Figure 23:
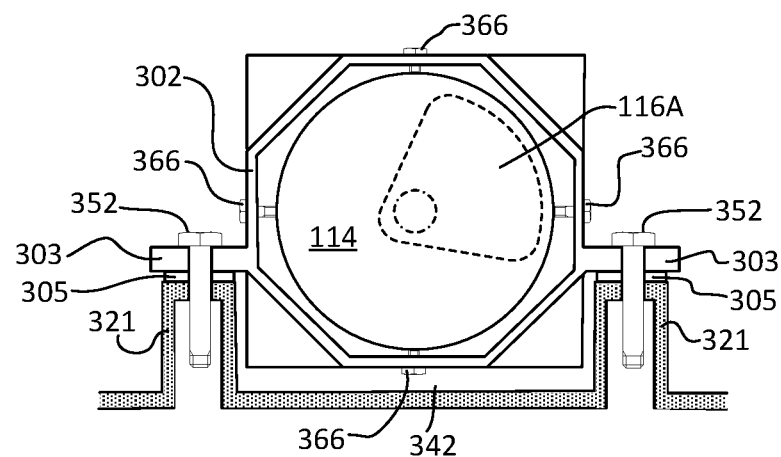
FIG. 23 is a sectional view of the motor housing, motor, and a portion of the case taken along the line 23-23 of FIG. 19.

First rotor is located near the end of motor housing 302 and additionally includes a first weighted body 116A. First weighted body 116A is about a 135 degree triangle or pie shape as shown in FIGS. 11 and 23, although the shape, angle, and thickness of the weight can be adjusted to change the vibration created by rotating weighted body 116A. Where an optional second rotor is included, it is located at an opposite end from first rotor and further includes second weighted body 116B connected either directly to the second rotor shaft 112B or apart from the second rotor shaft, producing vibrations. Embodiments where the weighted bodies are attached either to the rotor shafts or apart from the rotor shafts are discussed above and shown in FIGS. 1-12. First, and where included second rotors, further include first and second radial bearings 330A and 330B respectively as shown in FIGS. 13 and 19 and are adapted to turn or rotate relative to the motor housing. Preferably bearings 330A and 330B are 40 millimeter bearings. Other components detailed with respect to the vibrator mechanism, such as a snap ring, clip ring, or spring clip 110 in FIG. 12, are also anticipated to be present in the bi-directional embodiment as well, such as snap ring 331A, as shown in FIG. 24. Appropriate radial bearing arrangements and associated components are also discussed above and shown in FIGS. 1-12.

The case 300 that attaches to a standard float 301 using industry standard float adapter bolt layouts is preferably made from aluminum and more preferably from 3/16 inch thick aluminum. Case 300 includes a top 341 and/or an optional removable lid 360, a bottom 342, a front 343, a back 344, a first end 345, and a second end 346. Where lid 360 is present, it preferably replaces top 341, sits on top of front 343, back 433, and sides 345 and 346, and is secured with fasteners 415 such as screws or bolts that fit into holes 415A defined by the front, back, and sides. Alternatively, it my attach with other types of locking or secure fasteners, and preferably is supported by an O-ring or other seal 420 that extends around the top edges of front 343, first end 345, back 344, and second end 346. Case 300 attaches to the float preferably with bolts 500 inserted through bolt openings 322. Bolts may extend through both the top 341 or lid 360 and bottom 342 of the case or through just the bottom 342 of the case.

In a preferred embodiment, as shown in FIG. 21, bolts 500 extend through a openings defined by lid 360, through supports 502 that are positioned in case 300 between lid 360 and bottom 342, and through the bolt or case openings 322 on case bottom 342. Supports 502 preferably are configured to strengthen case 300 to prevent lid 360 from sagging, bending, or collapsing and to protect the inside of case 300 from moisture. For example, supports may be constructed of a strong, rigid, solid, and moisture-resistance material. To further insulate and protect the inside of case 300, preferably support O-rings or seals 504 are placed at the top and bottom of each support to create a barrier between the lid 360 and supports 502 and the bottom of case 342 and supports 502 as shown in FIG. 21. The preferred distance 610 between the center of supports 502 that are located closest to the remote receiver 310 and the outer edge of case 300's first end 345 is 4 5/8 inches, as shown in FIG. 19.

Figure 16:
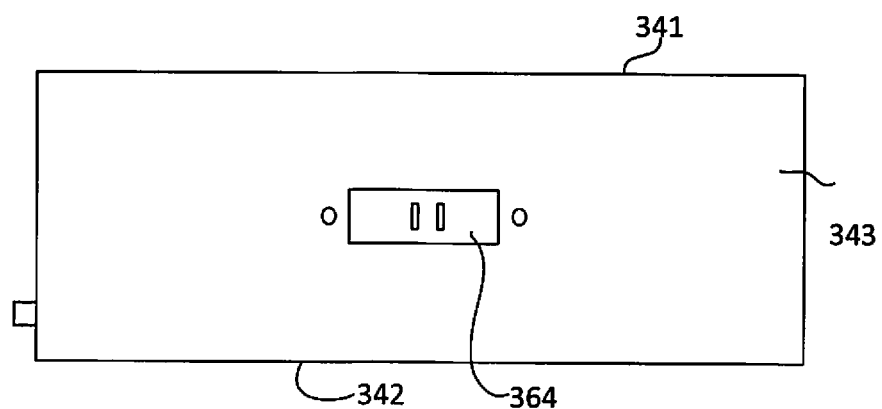
FIG. 16 is a front view of the embodiment shown in FIG. 13.
Figure 17:
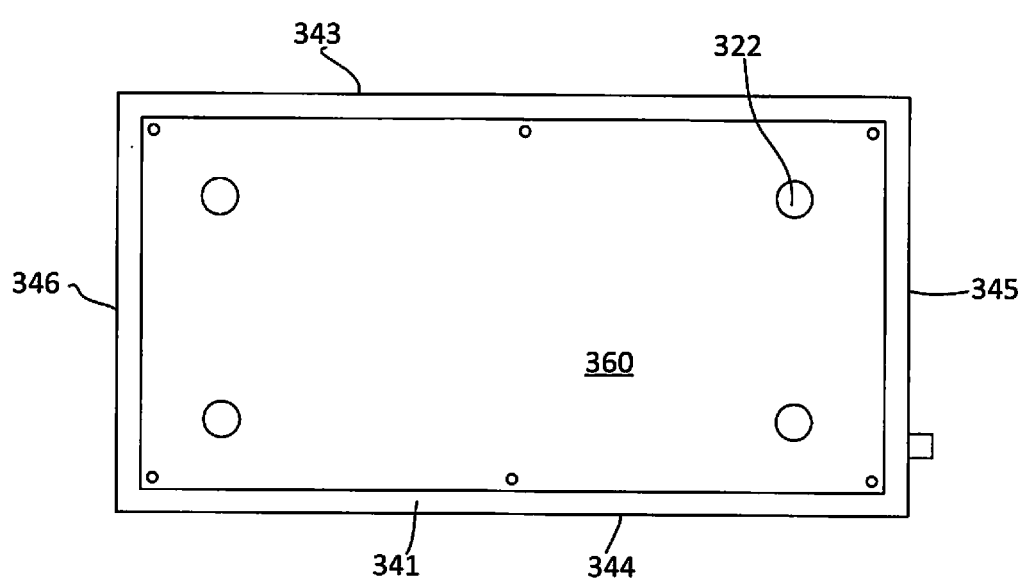
FIG. 17 is a top view of the embodiment shown in FIG. 13.

Lid 360 is located in place of or in a portion of top 341 of case 300 to provide access to the vibrating mechanism and components housed within the case. On one or both sides 345 and 346 of case 300 one or more hinged access doors, rubber or pipe plugs, threaded caps, or large set screws, 362 are located to provide access to the components within and specifically to provide access to bearing 330A and optional bearing 330B for lubrication and maintenance. Alternatively, any removable object can be used as long as it provides a sealable access port for the bearings. In one embodiment, as shown in FIG. 16, on the front 343 of case 300 a battery socket 364 is located to provide access to the battery 304 for recharging. Battery socket 364 may be a female socket for receiving a removable and rechargeable battery or battery socket 364 may be simply a charging port for a rechargeable battery fixedly secured in case 300. In another embodiment, as shown in FIG. 23, the battery is located outside case 300 but positioned on and attached to lid 360 and is preferably secured to a female socket located in lid 360. The battery, either directly or through the female socket, is coupled to motor 114 and the remote activation components as well as any other inputs present on the device, at connection point 550 for motor 114, as shown as a boxed area around positive and negative connection points in FIG. 19.

The optional variable speed motor controller 306, which can be incorporated into receiver 310 or can be a separate component or can be both, is coupled to the motor 114 and receives input from the variable speed input 308 regarding at what speed the motor 114 should operate. Preferably, variable speed input 308 is a twist knob, and input 308 can be positioned on case 300, can be included as part of remote 400, or both. Any type of input that allows for section among numerous options can be used, however. Likewise, the receiver 310 and antenna 312 coupled to the motor 114 receive instructions regarding what direction to engage the bi-directional motor 114. Remote device 400 communicates wirelessly with receiver 310 and preferably includes a remote input 412. Input 412 may be one or more knobs, switches, or any other input types suitable for selecting how to engage the motor 114. Remote device 400 may be worn by the operator, for example as a necklace or on a lanyard, or it may be removably attached to the pole connected to the float. Motor 114 may also be powered on and off or otherwise activated and its direction controlled by a switch 311 or knob that is located on or in case 300 and coupled with wires or couplers (not labelled) to one or more of the receiver 310, the antenna 312, the battery 304, and motor 114. Preferably, switch 311 acts as a master switch and includes three positions. A first position for selecting remote control, a neutral position for turning the device off, and a third position for selecting manual mode where the inputs located on the device are used to control and adjust the motor's direction and speed.

FIGS. 23 and 24 illustrate an alternate embodiment for motor housing 302. As shown, motor housing 302 includes vented corners 302A around motor 114. The vented corners may be any size and shape, but preferably there is at least 3/16 of an inch of housing material surrounding each of the vented corners 302A to maintain the overall motor housing 302 shape and prevent separation of the edges. Additionally, motor housing 302 includes a plurality of housing protrusions 303 that each define an opening or channel 303A therethrough. Each protrusion 303 is sized and positioned on housing 302 so that it cooperates with pillars 321 of case 300, and each opening 303A is sized with approximately the same diameter as openings 320 so that a connector or fastener 352 can be placed through openings 320 and 303A to secure motor housing 302 to case 300. Fastener 352 is preferably 3/8 or 5/16 inch bolts, but any type of resilient and locking or secure fastener is acceptable. When motor housing 302 is secured to case 300 using pillars 321 and protrusions 303, motor housing is preferably suspended so that the body of motor housing 302 does not contact the body of case 300, as shown in FIG. 23. Also preferably, one or more optional spacers 305 are positioned between each protrusion 303 and elevated section 321 of case 300. Spacers 305 are preferably a resilient material such as rubber that is about 1/8 inch thick to cushion the contact between the motor mount and case, especially when the vibration mechanism is active.

Operationally, the bi-directional motor 114 can rotate the first and second rotors either clockwise or counterclockwise to encourage an overall movement of the motor, rotors, and attached float either backward or forward. Preferably, when the operator wishes to push the float forward, he selects the appropriate direction for the motor using input 412 on remote device 400 or using input 311 on the case. Then, when the operator wishes to pull the float backward, he reverses the direction of the motor using input 412 on remote device 400 or using input 311 on the case. By somewhat propelling the float forward or backward, the operator will gain valuable assistance, which will prevent fatigue.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

I claim:

1. A vibrator mechanism usable with a concrete finishing tool and a float having industry standard float adaptor bolt layout, the vibrator mechanism comprising:
   a. a case comprising a lid and defining a case chamber, wherein the case is configured to cooperate with the float's industry standard float adaptor bolt layout and the lid is configured to cooperate with the concrete finishing tool;
   b. a motor housing removably attached to and positioned within the case chamber wherein the motor housing defines a housing chamber; and
   c. a vibrator positioned at least partly within the housing chamber of the motor housing wherein the vibrator comprises:
      i. a bi-directional motor comprising an output shaft;
      ii. a support, wherein the support defines a bore therethrough;
      iii. a rotor located at least partly within the bore of the support and being adapted to turn relative to the support, wherein the rotor comprises a shaft extending outwardly from the rotor and a weighted body connected to the shaft; and
      iv. a resilient link connecting the output shaft of the motor to the rotor shaft.

2. The vibrator mechanism of claim 1 further comprising:
   a. a variable speed controller positioned in the case chamber and in electrical communication with the motor; and
   b. a variable speed input positioned on the case and in electrical communication with the variable speed controller.

3. The mechanism of claim 1 wherein the coupler comprises a coupler.

4. The vibrating mechanism of claim 1 further comprising an adaptor removably attached to the lid and configured to cooperate with a concrete finishing tool.

5. The vibrating mechanism of claim 1 wherein the case comprises:
   i. a bottom section configured to cooperate with the float's industry standard float adapter bolt layout;
   ii. opposing front and back sides attached to the bottom section, wherein the front and back sides are substantially parallel to a leading edge and a trailing edge of the cooperating float when case is attached to the float according to the industry standard float adaptor bolt layout; and
   iii. opposing first and second ends attached to the bottom section and positioned between the front and back sides such that the front side, first end, back side, and second end form at perimeter around the bottom section and together with the bottom section form the case chamber;
   wherein the motor housing is oriented within the case chamber such that the weighted body of the rotor is positioned substantially parallel to and near the first end and wherein the lid removable attaches to the sides and ends at a spaced distance from the case bottom.

6. The vibrator mechanism of claim 5 wherein:
   a. the case bottom section further comprises a plurality of pillars;
   b. the motor housing further comprises a plurality of protrusions; and
   c. a plurality of fasteners connect the motor housing protrusions to the case bottom section pillars.

7. The vibrator mechanism of claim 6 further comprising a plurality of spacers, wherein a spacer attaches between each motor housing protrusion and case bottom section pillar.

8. The vibrator mechanism of claim 5 further comprising an anchor positioned on the motor housing and configured to hold the vibrator within the motor housing at a spaced relationship from the inner surface of the motor housing.

9. The vibrator mechanism of claim 8 wherein the anchor comprises at least one set screw.

10. The vibrator mechanism of claim 9 wherein the motor housing defines a plurality of vents positioned at spaced intervals between the anchors and surrounding the motor.

11. The vibrator mechanism of claim 5 further comprising a seal positioned between the lid and the case sides and ends.

12. The vibrator mechanism of claim 5 wherein the bottom defines case openings positioned to cooperate with industry standard bolt layouts, wherein the lid defines lid openings positioned to cooperate with industry standard bolt layouts, and wherein the vibrator mechanism further comprises a plurality of supports configured to extend from the case openings to the lid openings and to receive fasteners therethrough.

13. The vibrator mechanism of claim 12 further comprising a plurality of support seals, wherein a seal is positioned between each lid opening and support and between each case opening and support.

14. The vibrator mechanism of claim 1 further comprising a battery removably attached to the lid and in electrical communication with the motor of the vibrator.

15. The vibrator mechanism of claim 14 further comprising a remote controlled switch positioned in the case and in electrical communication with the battery and motor, wherein the remote controlled switch receives signals from a remote activation device and activates the motor according to the signals received from the remote activation device.

16. The vibrator mechanism of claim 15 further comprising:
   a. a variable speed controller positioned in the case chamber and in electrical communication with the motor; and
   b. a variable speed input positioned on the remote activation device and in wireless communication with the variable speed controller.

17. The mechanism of claim 1 wherein the vibrator further comprises a bearing positioned between the support and the rotor.

18. The vibrator mechanism of claim 17 wherein the first end of the case further comprises an access port positioned on the first end.

19. A vibrator mechanism usable with a concrete finishing tool and a float having industry standard float adaptor bolt layout, the vibrator mechanism comprising:
   a. a case comprising:
      i. a substantially rectangular bottom section defining a plurality of pillars and configured to cooperate with the float's industry standard float adaptor bolt layout;
      ii. opposing front and back sides and opposing first and second ends fixedly attached to the bottom section around its perimeter to define a case chamber; and
      iii. a lid removably attached to the front and back sides and first and second ends at a spaced distance from the bottom section, wherein the lid is configured to cooperate with the concrete finishing tool;
   b. a motor housing comprising an inner surface and a plurality of protrusions, wherein the motor housing inner surface defines a housing chamber and wherein the motor housing protrusions removably attached to the case bottom section pillars with fasteners;
   c. a vibrator positioned at least partly within the housing chamber of the motor housing wherein the vibrator comprises:
      i. a bi-directional motor attached to the motor housing at a spaced relationship from the motor housing inner surface with a plurality of set screws, the bi-directional motor comprising an output shaft;
      ii. a support, wherein the support defines a bore therethrough;
      iii. a rotor located at least partly within the bore of the support and being adapted to turn relative to the support, wherein the rotor comprises a shaft extending outwardly from the rotor and a weighted body connected to the shaft;
      iv. a coupler connecting the output shaft of the motor to the rotor shaft; and
      v. a bearing positioned between the support and the rotor;
   d. a variable speed controller positioned in the case chamber and in electrical communication with the motor; and
   e. a variable speed input positioned on the case and in electrical communication with the variable speed controller.

20. The vibrator mechanism of claim 19 further comprising an adaptor removably attached to the lid and configured to cooperate with a concrete finishing tool.

* * * * *